United States Patent
Bao et al.

(10) Patent No.: US 9,485,109 B2
(45) Date of Patent: Nov. 1, 2016

(54) CARRIER AGGREGATION METHODS OF BROADCAST CHANNELS WITH BROADCAST CHANNELS OR BROADCAST CHANNELS WITH UNICAST CHANNELS

(71) Applicant: QUALCOMM Incorporated, San Diego, CA (US)

(72) Inventors: Gang Bao, San Diego, CA (US); Jun Wang, Poway, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 14/514,293

(22) Filed: Oct. 14, 2014

(65) Prior Publication Data

US 2016/0105880 A1    Apr. 14, 2016

(51) Int. Cl.
| | |
|---|---|
| H04H 20/71 | (2008.01) |
| H04L 12/18 | (2006.01) |
| H04L 5/00 | (2006.01) |
| H04W 4/06 | (2009.01) |
| H04W 48/12 | (2009.01) |

(52) U.S. Cl.
CPC ............ *H04L 12/189* (2013.01); *H04L 5/001* (2013.01); *H04W 4/06* (2013.01); *H04W 48/12* (2013.01)

(58) Field of Classification Search
CPC .......... H04W 72/0406; H04W 72/005; H04L 12/189
See application file for complete search history.

(56) References Cited

U.S. PATENT DOCUMENTS

| | | | | |
|---|---|---|---|---|
| 8,570,928 B2 * | 10/2013 | Wu | ..................... | H04W 72/005 370/312 |
| 2010/0296389 A1 * | 11/2010 | Khandekar | ........... | H04L 5/0007 370/216 |
| 2011/0013576 A1 * | 1/2011 | Hsu | ..................... | H04W 72/005 370/329 |
| 2011/0039499 A1 * | 2/2011 | Zhang | ................. | H04W 74/008 455/67.11 |
| 2012/0044850 A1 * | 2/2012 | Wang | .................. | H04W 72/005 370/312 |
| 2012/0213130 A1 * | 8/2012 | Zhang | ..................... | H04L 5/001 370/280 |
| 2012/0236776 A1 * | 9/2012 | Zhang | .................. | H04W 48/12 370/312 |
| 2013/0315124 A1 | 11/2013 | Rapaport et al. | | |
| 2014/0044071 A1 * | 2/2014 | Piggin | .................. | H04L 5/0096 370/329 |
| 2014/0282777 A1 | 9/2014 | Gonder et al. | | |
| 2015/0173056 A1 * | 6/2015 | Yerramalli | ............ | H04W 16/14 370/329 |
| 2016/0105880 A1 * | 4/2016 | Bao | ....................... | H04L 12/189 370/312 |

FOREIGN PATENT DOCUMENTS

WO        2014065998 A1    5/2014

OTHER PUBLICATIONS

International Search Report and Written Opinion—PCT/US2015/051874—ISA/EPO—Dec. 11, 2015.
Iguyen N.D., et al., "Service continuity for eMBMS in LTE/LTE-Advanced network: Standard analysis and supplement", 2014 IEEE 11th Consumer Communications and Networking Conference (CCNC), Jan. 10, 2014, XP032626126, pp. 219-224, DOI:10.1109/CCNC.2014.6866574 [retrieved on Jul. 25, 2014].

\* cited by examiner

*Primary Examiner* — Robert Wilson
(74) *Attorney, Agent, or Firm* — Arent Fox LLP

(57) ABSTRACT

A method, an apparatus, and a computer program product for wireless communication are provided. The apparatus may be a UE. The UE monitors a first component carrier and at least one second component carrier of a plurality of aggregated component carriers for a service and configuration information associated with the service. The UE receives the service concurrently via the first component carrier and the at least one second component carrier. At least one of the first component carrier or the at least one second component carrier carries the service via broadcast.

22 Claims, 15 Drawing Sheets

CARRIER AGGREGATION METHODS OF BROADCAST CHANNELS WITH BROADCAST CHANNELS OR BROADCAST CHANNELS WITH UNICAST CHANNELS

BACKGROUND

1. Field

The present disclosure relates generally to communication systems, and more particularly, to receiving a service concurrently via aggregated carriers.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided.

According to an aspect, a method of wireless communication includes monitoring a first component carrier and at least one second component carrier of a plurality of aggregated component carriers for a service and configuration information associated with the service. The method further includes receiving the service concurrently via the first component carrier and the at least one second component carrier. At least one of the first component carrier or the at least one second component carrier carries the service via broadcast.

According to an aspect, an apparatus for wireless communication includes a memory. The apparatus further includes at least one processor coupled to the memory. The at least one processor is configured to monitor a first component carrier and at least one second component carrier of a plurality of aggregated component carriers for a service and configuration information associated with the service. The at least one processor is further configured to receive the service concurrently via the first component carrier and the at least one second component carrier. At least one of the first component carrier or the at least one second component carrier carries the service via broadcast.

According to an aspect, an apparatus for wireless communication includes means for monitoring a first component carrier and at least one second component carrier of a plurality of aggregated component carriers for a service and configuration information associated with the service. The apparatus further includes means for receiving the service concurrently via the first component carrier and the at least one second component carrier. At least one of the first component carrier or the at least one second component carrier carries the service via broadcast.

According to an aspect, a computer program product stored on a computer-readable medium includes code. When executed on at least one processor, the code causes the at least one processor to monitor a first component carrier and at least one second component carrier of a plurality of aggregated component carriers for a service and configuration information associated with the service. The code further causes the at least one processor to receive the service concurrently via the first component carrier and the at least one second component carrier. At least one of the first component carrier or the at least one second component carrier carries the service via broadcast.

DETAILED DESCRIPTION

Figure 1:
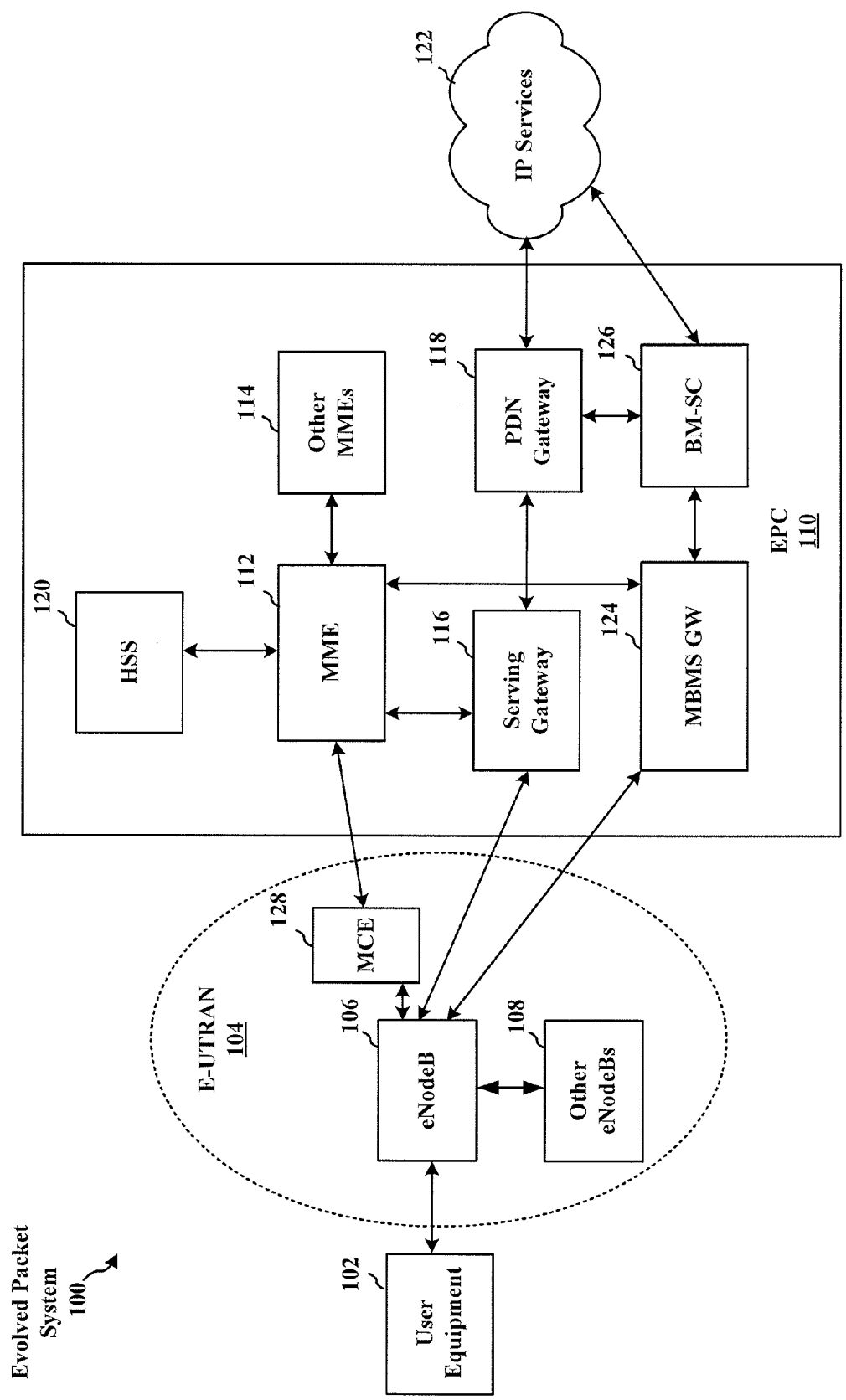
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
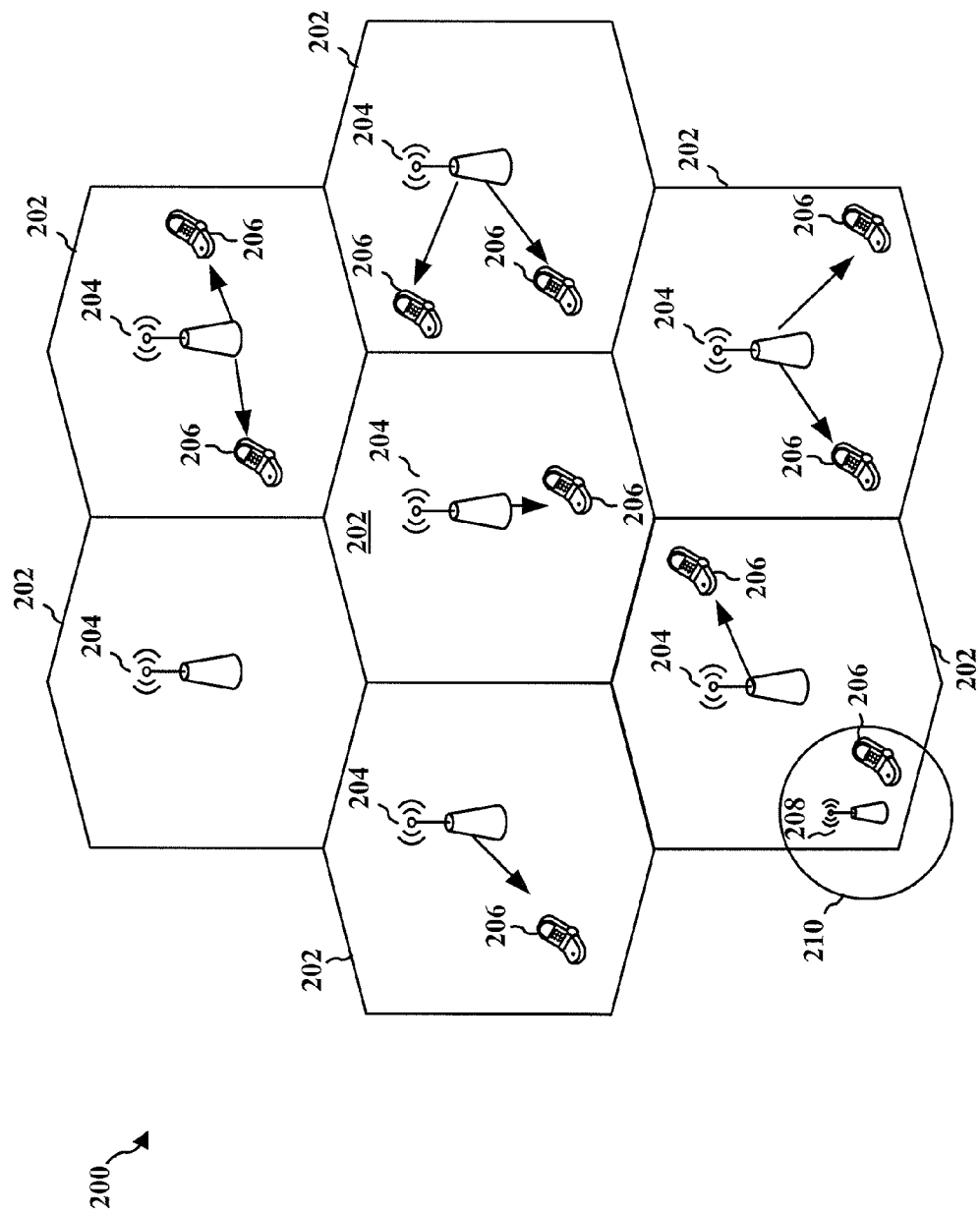
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
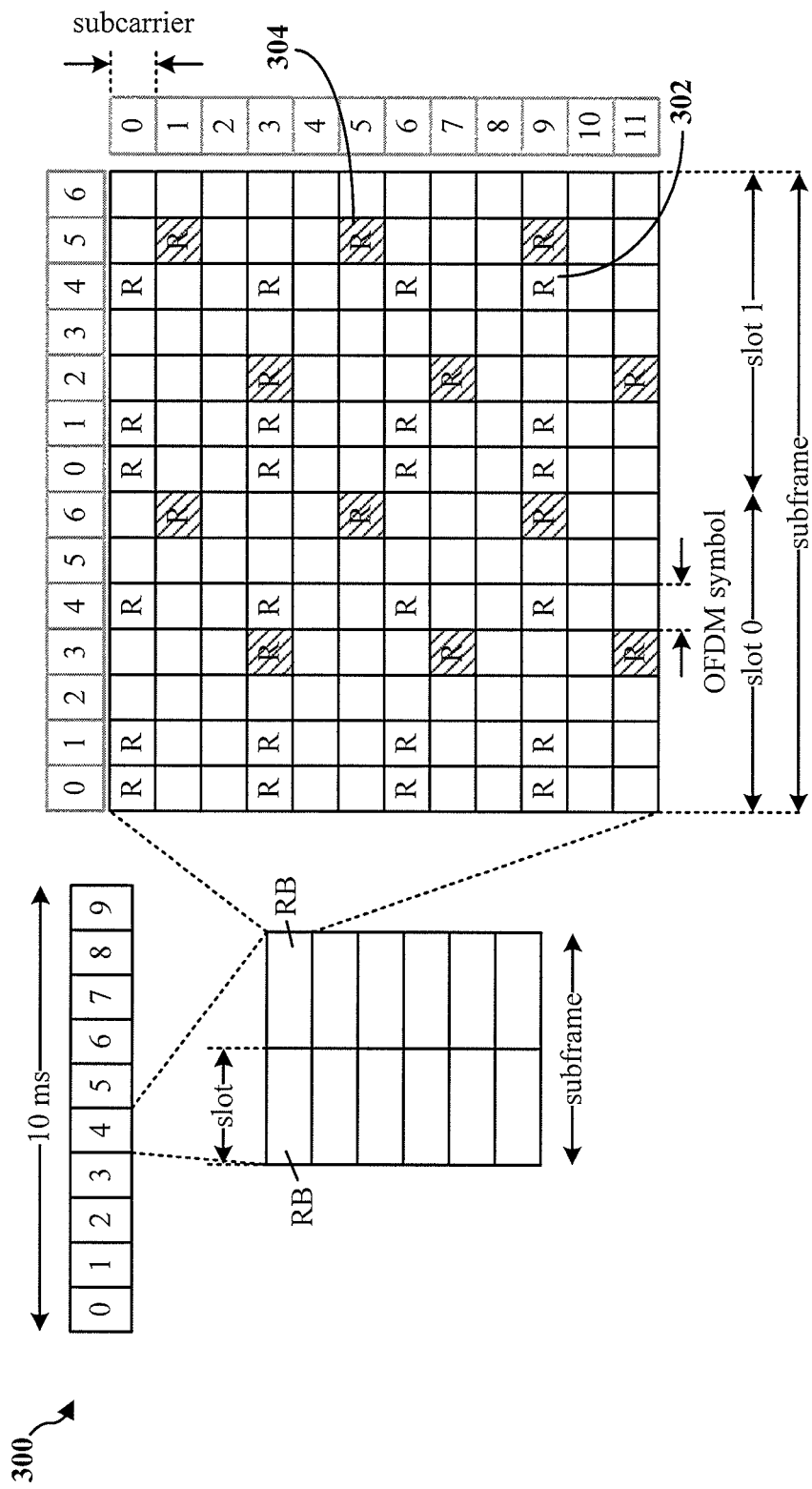
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
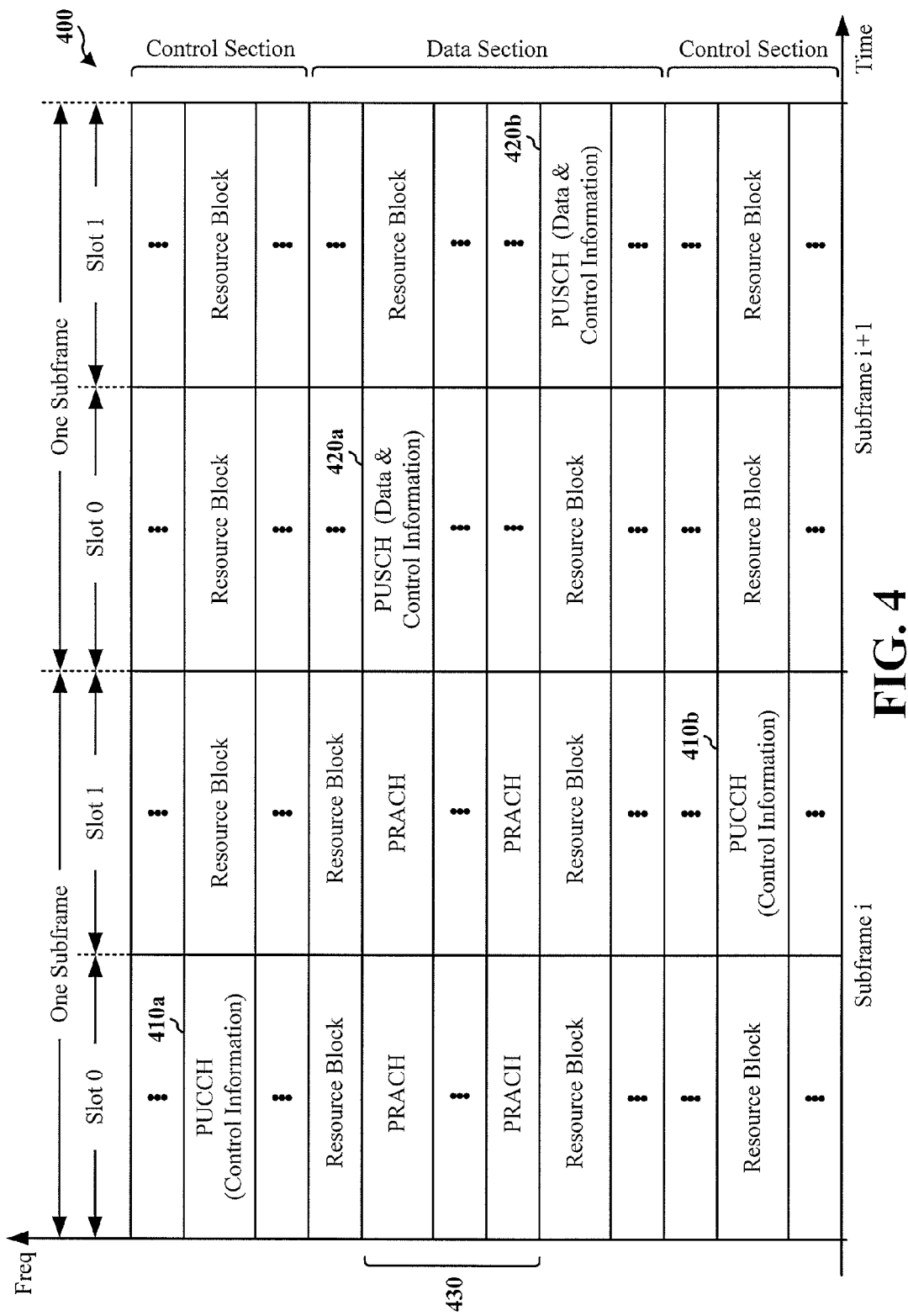
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410*a*, 410*b* in the control section to transmit control information to an eNB.

The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
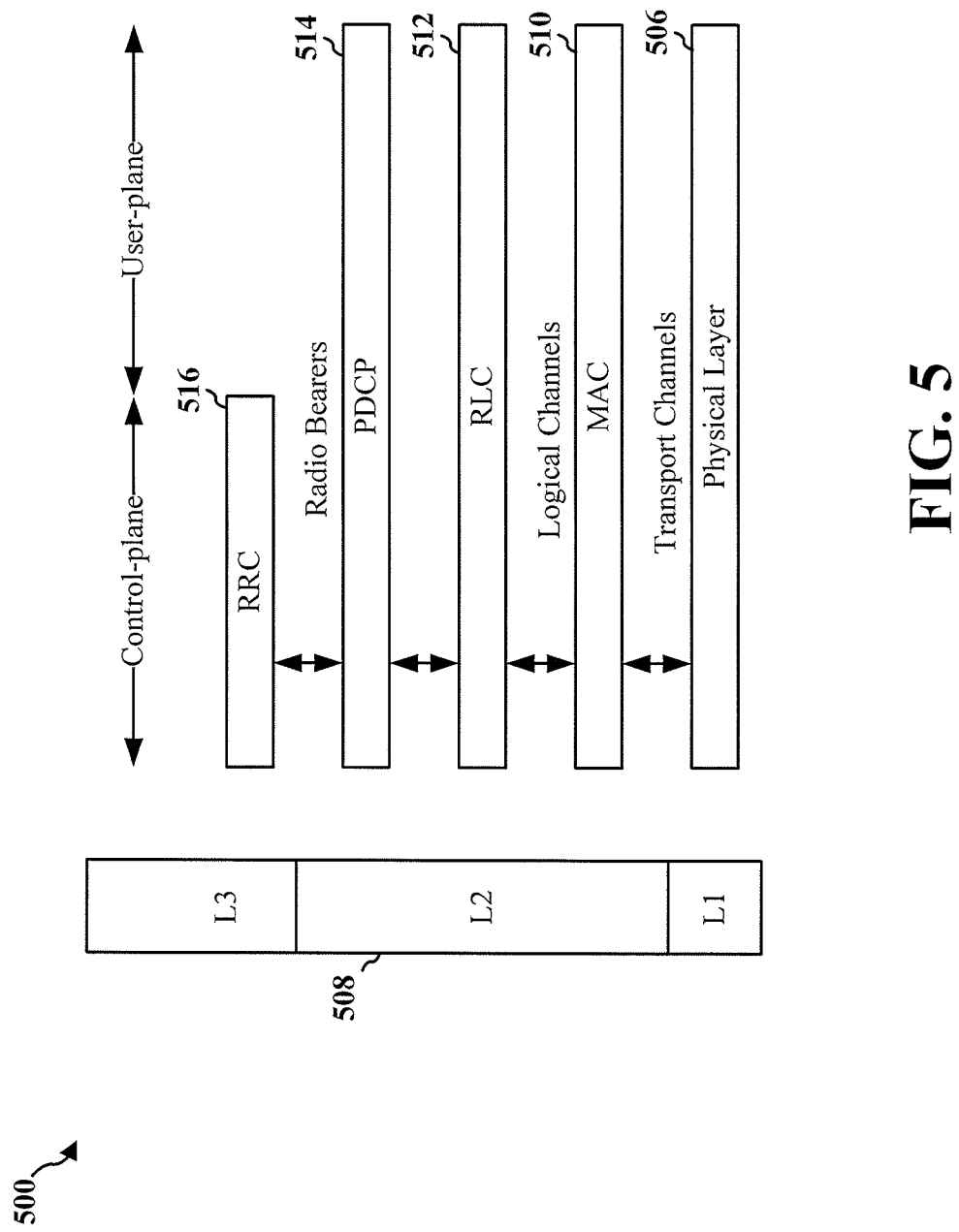
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARM). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
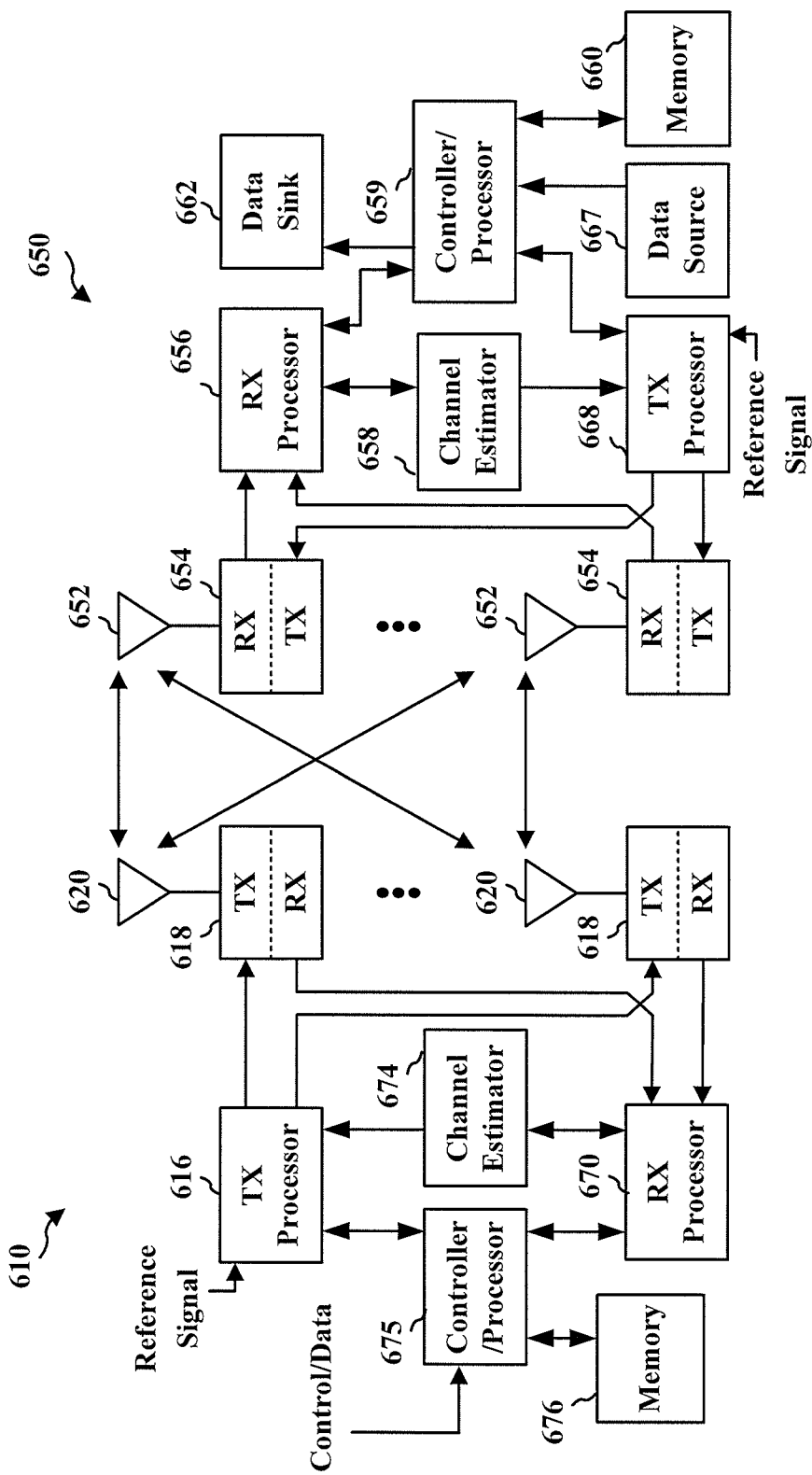
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7B:
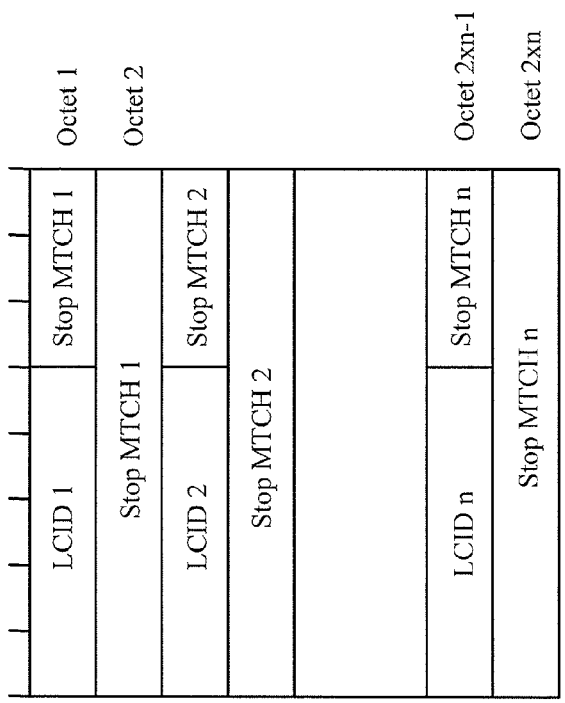
FIG. 7B is a diagram illustrating a format of a Multicast Channel Scheduling Information Media Access Control control element.
Figure 7A:
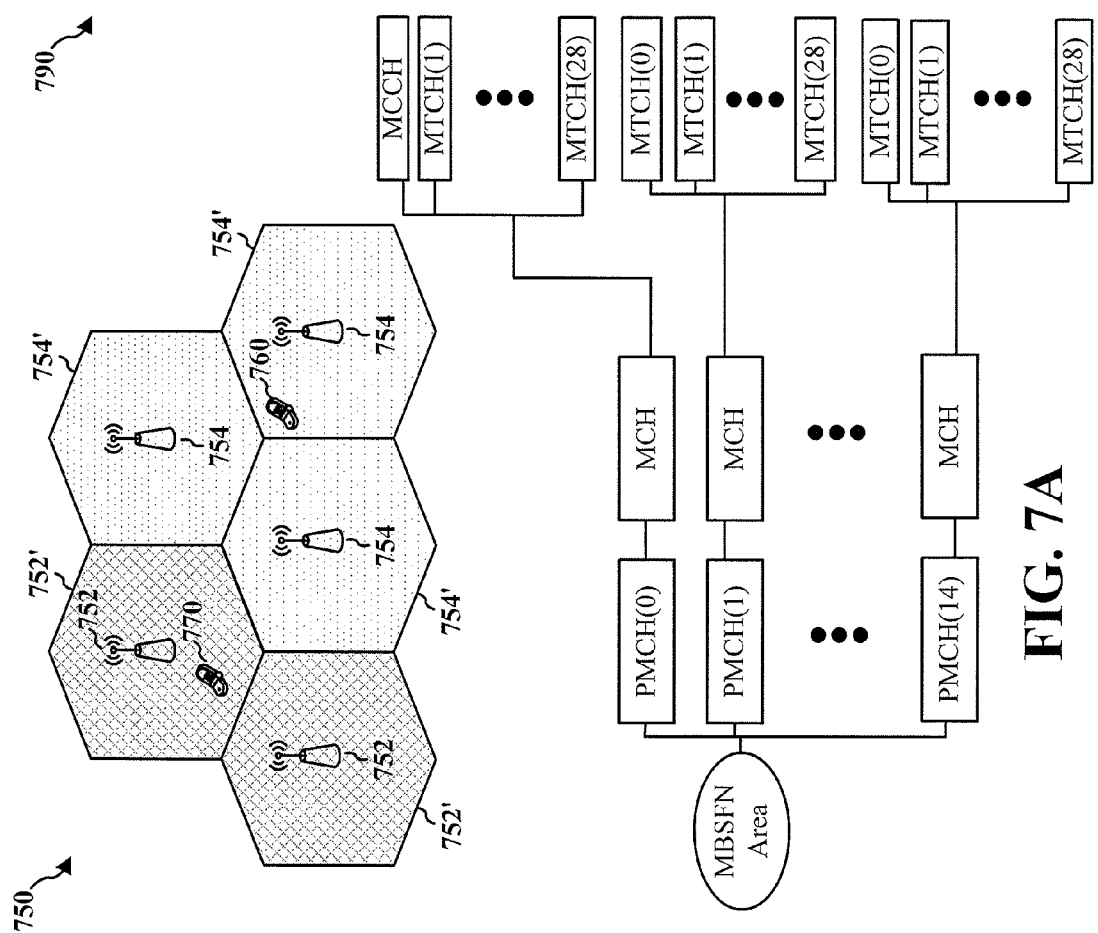
FIG. 7A is a diagram illustrating an example of an evolved Multimedia Broadcast Multicast Service channel configuration in a Multicast Broadcast Single Frequency Network.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports one or more physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. Initially, the UE may acquire a system information block (SIB) 13 (SIB13). Subsequently, based on the SIB13, the UE may acquire an MBSFN Area Configuration message on an MCCH. Subsequently, based on the MBSFN Area Configuration message, the UE may acquire an MCH scheduling information (MSI) MAC control element. The SIB13 may include (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

Aspects of the disclosure are directed to receiving a single service (e.g., a single eMBMS service) concurrently via two or more aggregated carriers. On at least one of the aggregated carriers, the single service is received via broadcast.

Each of the aggregated carriers may be referred to as a component carrier (CC), and up to five CCs may be aggregated in a particular instance. The bandwidth of each CC may be 1.4, 3, 5, 10, 15 or 20 MHz, for example.

Aggregated carriers may include CCs that belong to a same operating frequency band (or operating spectrum). Examples of individual frequency bands include LTE, LTE-Unlicensed (LTE-U), etc. LTE frequency bands may be at 700 MHz or 2 GHz. LTE-U frequency bands may be at 2.4 GHz or 5 GHz. The CCs may be referred to as intra-band CCs. The intra-band CCs may be contiguous or non-contiguous with respect to frequency. Non-contiguous CCs are separated by a gap in frequency.

Aggregated carriers may also include CCs that belong to different operating frequency bands. These CCs may be referred to as inter-band CCs.

According to one aspect, a set of aggregated carriers may include a combination of intra-band CCs and inter-band CCs. For example, a set of aggregated carriers may include one or more CCs that belong to a first operating frequency band and one or more CCs that belong to a second operating frequency band.

From the perspective of a network providing a service, aggregating CCs increases an effective transmission bandwidth. Accordingly, a corresponding bit rate is increased as well.

The increased bandwidth and bit rate may be useful in various contexts. For example, the increased bit rate may be useful when providing a service that requires a very high data rate, such as the transmission of video having 4K resolution (horizontal resolution on the order of 4,000 pixels). As another example, the increased bandwidth may be useful when the bandwidth that is available in a particular frequency band is limited and, therefore, may not be sufficient to support a particular service. In such a situation, a network may wish to provide the service (e.g., an eMBMS service) by also using bandwidth that is available in another frequency band. For example, the network may use aggregated carriers from two or more operating frequency bands.

According to one aspect, a network uses a first CC to transmit primary content, and uses a second CC to send secondary content. The primary content and the secondary content may correspond to a single eMBMS service. The primary content may be carried by the first CC via broadcast. The secondary content may be carried by the second CC also via broadcast. The secondary content that is broadcast may improve the resolution of the primary content. For example, the secondary content may provide high-definition (HD) resolution, such that a combination of the primary content and the secondary content produces HD video. Alternatively, or in addition, the secondary content may be carried by the second CC via unicast. In this manner, the secondary content may be provided to one or more selected recipients (e.g., one or more selected UEs).

According to another aspect, an operator uses a first CC to send primary content, and uses a second CC to send secondary content. The primary content and the secondary content may correspond to a single eMBMS service. The primary content is carried by the first CC via broadcast. The secondary content may be carried by the second CC via unicast. The secondary content may be for enhancing service reliability for one or more selected recipients (e.g., one or more selected UEs), or for providing recovery of missing data (e.g., data that was reported as undelivered) to one or more selected recipients.

These and other aspects will be described in more detail below.

Figure 8:
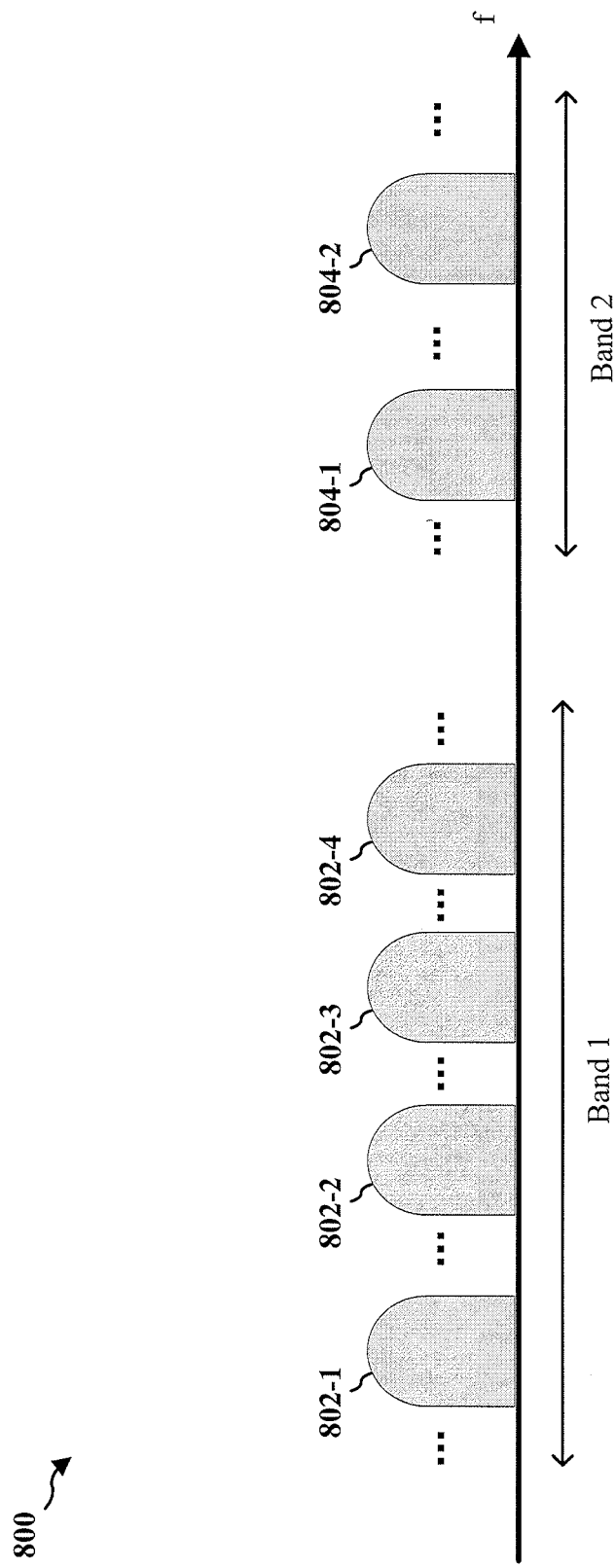
FIG. 8 is a diagram illustrating carriers belonging to one operating frequency band and carriers belonging to another frequency band.

FIG. 8 is a diagram 800 illustrating carriers belonging to one operating frequency band ("Band 1") and carriers belonging to another frequency band ("Band 2"). Carriers 802-1, 802-2, 802-3 and 802-4 belong to Band 1, and carriers 804-1 and 804-2 belong to Band 1.

Regarding Band 1, carriers 802-1, 802-2, 802-3 and 802-4 are non-contiguous in that adjacent carriers are separated by a gap in frequency. However, it is understood that any two adjacent carriers in Band 1 (e.g., 802-1 and 802-2) may be contiguous.

Regarding Band 2, carriers 804-1 and 804-2 are non-contiguous in that these carriers are separated by a gap in frequency. However, it is understood that carriers 804-1 and 804-2 may be contiguous.

Band 1 and Band 2 may correspond to different operating frequency spectrums. For example, Band 1 may correspond to an LTE spectrum. As a further example, Band 2 may correspond to an LTE Unlicensed (LTE-U) spectrum.

According to one aspect, any two or more of the carriers 802-1, 802-2, 802-3, 802, 804-1, 804-2 are aggregated to concurrently provide a single service (e.g., a single eMBMS service).

For example, the carriers 802-1 and 802-2 may be aggregated. In this example, the aggregated carriers all belong to Band 1 (e.g., LTE spectrum).

As another example, the carriers 802-2 and 804-1 may be aggregated. In this example, the aggregated carriers include a carrier belonging to Band 1 (e.g., LTE spectrum) or a carrier belonging to Band 2 (e.g., LTE Unlicensed spectrum).

As yet another example, the carriers 804-1 and 804-2 may be aggregated. In this example, the aggregated carriers all belong to Band 2 (e.g., LTE Unlicensed spectrum).

Further according to the noted aspect, a single service (e.g., a single eMBMS service) may be received concurrently via the aggregated two or more carriers. That is, a recipient of the service (e.g., a UE) tunes to all of the aggregated carriers, and receives the service by effectively combining data that is carried on the aggregated carriers. On at least one of the aggregated carriers, the single service is received via broadcast.

According to a further aspect, the single service is received on each of the aggregated carriers via broadcast.

For example, in the configuration in which the carriers 802-1 and 802-2 are aggregated, the service is received on each of the carriers 802-1 and 802-2 via broadcast. As another example, in the configuration in which carriers 802-2 and 804-1 are aggregated, the service is received on each of the carriers 802-2 and 804-1 via broadcast. As yet another example, in the configuration in which the carriers 804-1 and 804-2 are aggregated, the service is received on each of the carriers 804-1 and 804-2 via broadcast.

According to another further aspect, the single service is received on at least one of the aggregated carriers via unicast.

For example, in a configuration in which the carriers 802-1 and 802-2 are aggregated, the service is received on the carrier 802-1 via broadcast and the carrier 802-2 via unicast. Further, the service may also be received on the carrier 802-1 (which carries the service via broadcast) via unicast. Accordingly, a broadcast portion(s) and a unicast portion(s) of the service may be carried on a same frequency, or may be carried on different frequencies.

As another example, in a configuration in which the carriers 802-2 and 804-1 are aggregated, the service is received on the carrier 802-2 via broadcast and the carrier 804-1 via unicast. Alternatively, the service is received on the carrier 804-1 via broadcast and the carrier 802-2 via unicast.

As yet another example, in a configuration in which the carriers the carriers 804-1 and 804-2 are aggregated, the service is received on the carrier 804-1 via broadcast and the carrier 804-2 via unicast. Further, the service may also be received on the carrier 804-1 (which carries the service via broadcast) via unicast. Accordingly, a broadcast portion(s) and a unicast portion(s) of the service may be carried on a same frequency, or may be carried on different frequencies.

According to one aspect, the aggregation of carriers and the transmission of the single service on the aggregated carriers are performed at the MAC sublayer (see, e.g., FIG. 5, 510) and the physical layer (see, e.g., FIG. 5, 506).

Figure 9:
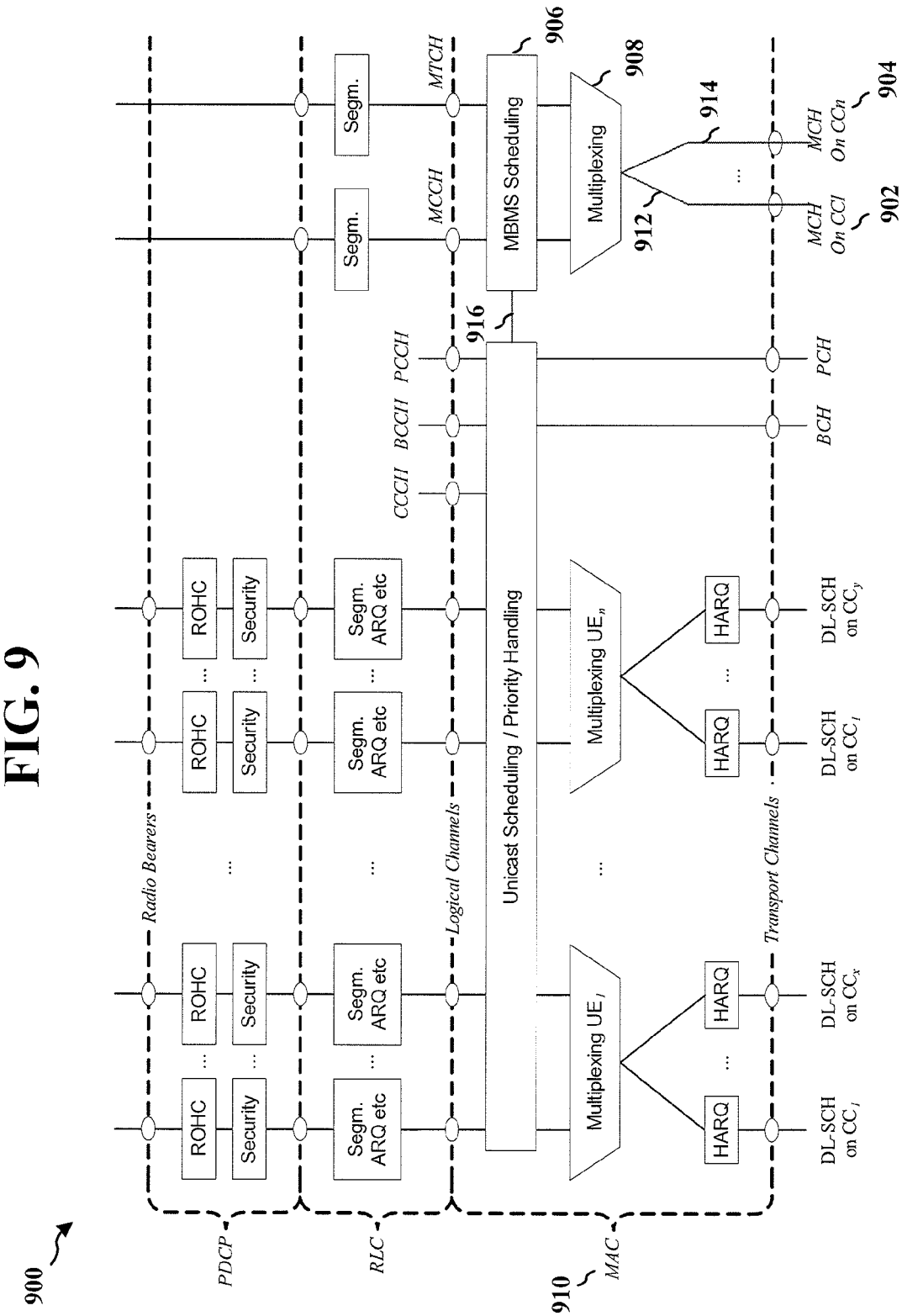
FIG. 9 is a diagram illustrating an example of a radio protocol architecture for the user and control planes.

Similar to FIG. 5, FIG. 9 is a diagram 900 illustrating an example of a radio protocol architecture for the user and control planes. With reference to FIG. 9, the aggregation of carriers (as disclosed earlier with reference to FIG. 8) is carried out in the MAC layer 910. For example, the carriers 902 and 904 may be aggregated to transmit a single eMBMS service via broadcast. The output of the Multiplexing module 908 is effectively divided amongst the carriers 902 and 904 (see, e.g., 912 and 914 of FIG. 9). In other words, the Multiplexing module 908 performs a demultiplexing operation in addition to a multiplexing function. In this manner, the carriers 902 and 904 carry different broadcast portions of the eMBMS service. By way of example, the carriers 902 and 904 may correspond to the carriers 802-1 and 802-2, the carriers 802-2 and 804-1, or the carriers 804-1 and 804-2 (see FIG. 8).

As described earlier with reference to FIG. 8, the single service may be received on at least one of the aggregated carriers via unicast. Unicast content is provided to the MBMS Scheduling module 906 (see, e.g., 916 of FIG. 9). The scheduling of the unicast content relative to the broadcast content is performed at MBMS Scheduling module 906. For each packet that is broadcast, the MBMS Scheduling module 906 may forward a copy of the same packet to a unicast buffer for a scheduler to decide if that packet has been requested (via unicast uplink). Also for each packet that is broadcast, the MBMS Scheduling module 906 may save the packet at a broadcast buffer. A unicast scheduler may request that the broadcast scheduler forward the packet to the unicast scheduler when a request for that packet is received (via unicast uplink). The unicast scheduler will then send the missing packet through unicast.

As described earlier, at least two carriers may be aggregated to carry a single service, where each of the at least two carriers carries the service via broadcast. Configuration information regarding the configuration in which the carriers are aggregated is provided to a recipient (e.g., a UE). This configuration information will now be described in more detail.

According to one aspect, configuration information regarding the aggregated carriers may be included in a User Service Description (USD). According to another aspect, the configuration information regarding the aggregated carriers may be included in the USD and the MCCH. According to another aspect, the configuration information regarding the aggregated carriers may be included in the User Service Description and a SIB.

Configuration information that is sent to a recipient (e.g., a UE) through the USD facilitates proper reception and decoding of the service (e.g., an eMBMS service) via the aggregated carriers. The UE may receive the configuration information in the USD before it receives the eMBMS service via the aggregated carriers. Accordingly, when the USD receives the eMBMS service, it possesses configuration information necessary to receive and decode the service.

For each eMBMS service that is transmitted, the USD may include information regarding the aggregated carriers that carry the eMBMS service. For example, for each TMGI corresponding to an eMBMS service, the USD may include such information. The information may include identification of the carrier frequencies corresponding to the eMBMS service.

For example, for each TMGI, the USD may identify the frequencies of the aggregated carriers and the corresponding MBMS Service Area Identifier (SAI), which defines a group of cells that participates in the transmission of the service. This identification may take the form of a list—e.g., {Frequency_1, . . . , Frequency_n, MBMS SAI}. This implies that, if different frequencies are involved, a different SAI is needed. For example, a combination of a frequency and a SAI informs a UE that a broadcast service is available at its current location and at which frequency.

Together with the identification of the different frequencies, the configuration information in the USD may also identify a corresponding session start time/session stop time pairing for each of the frequencies. For example, the configuration information may indicate that the single service is carried on Frequency_1 starting at a particular time and stopping at a particular time. As another example, the configuration information may indicate that secondary content (e.g., data for improving the resolution of the primary content) is sent at a time that is different from the time that primary content is sent. The configuration information may further identify a particular carrier of the aggregated carriers as being a primary carrier that carries the primary (or base) content. The configuration information may further identify a carrier that is used for file repair. In this regard, the carrier that is used for file repair carries unicast content. According to a particular aspect, only frequencies in the LTE-U spectrum are used for file repair.

When the UE learns, based on the USD, that data of a particular service is carried by multiple frequencies concurrently (e.g., at the same time), the UE may try to receive the eMBMS service from the multiple frequencies concurrently. For example, the UE may tune to the multiple frequencies at the same time, in order to receive the eMBMS service.

Figure 10:
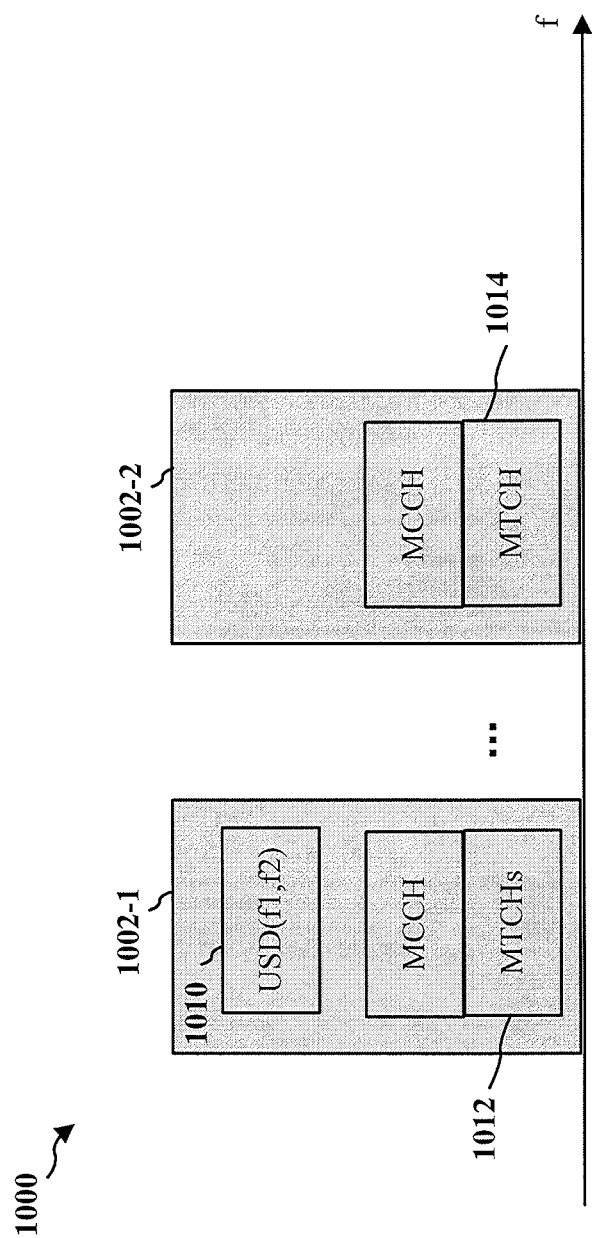
FIG. 10 is a diagram illustrating configuration information carried in a USD.

FIG. 10 is a diagram 1000 illustrating configuration information carried in a USD. With reference to FIG. 10, the USD 1010 includes configuration information regarding the aggregated carriers 1002-1 and 1002-2. For example, the USD 1010 may indicate that the single service is carried on carrier 1002-1 (e.g., MTCHs 1012 of carrier 1002-1) starting at a particular time and stopping at a particular time, and on carrier 1002-2 (e.g., MTCHs 1014 of carrier 1002-2) starting at a particular time and stopping at a particular time. As another example, the USD 1010 may indicate that the carrier 1002-1 as the carrier that carries primary content, such that secondary content is carried by the other carrier 1002-2.

If the configuration of the aggregated carriers changes during the course of the service, then the UE may continue to properly receive and decode the service if updated configuration information is provided to the UE via the USD.

According to another aspect, configuration information regarding the two aggregated carriers may be included in the USD and, additionally, the MCCH. The configuration information included may be provided initially via the USD, as described earlier with reference to FIG. 10. Additionally, the MCE (see, e.g., MCE 128 of FIG. 1) may update the configuration through the MCCH, e.g., through an MBSFN Area Configuration message of the MCCH. As described earlier with reference to FIG. 7A, the MBSFN Area Configuration message may indicate a TMGI and an optional session identifier of each MTCH identified by a logical channel identifier within the PMCH, and allocated resources (e.g., radio frames and subframes) for transmitting each PMCH of the MBSFN.

On a particular carrier, the MCCH may indicate a commonSF-Alloc parameter (which indicates the subframes allocated to the MBSFN area) or may include MCCH information for one or more additional carriers. This may accommodate a UE that may be unable to receive multiple frequencies simultaneously. For example, the MCCH on a particular carrier may indicate that MBSFN subframes 1, 2 and 3 of a first carrier are allocated for the service and that MBSFN subframes 6, 7 and 8 of a second carrier are allocated for the service.

The MCCH may provide configuration information in a parameter MBMS-SessionInfo-r9 parameter as follows:

```
MBMS-SessionInfo-r9 ::=      SEQUENCE {
    tmgi-r9                  TMGI-r9,
    sessionId-r9             OCTET STRING (SIZE(1))
                             OPTIONAL, -
- Need OP
    logicalChannelIdentity-r9   INTEGER
    (0..maxSessionPerPMCH-1),
    carrierFrequencyIdentity-r13   INTEGER
    size(1...maxFrequency),
    ... }
```

Figure 11:
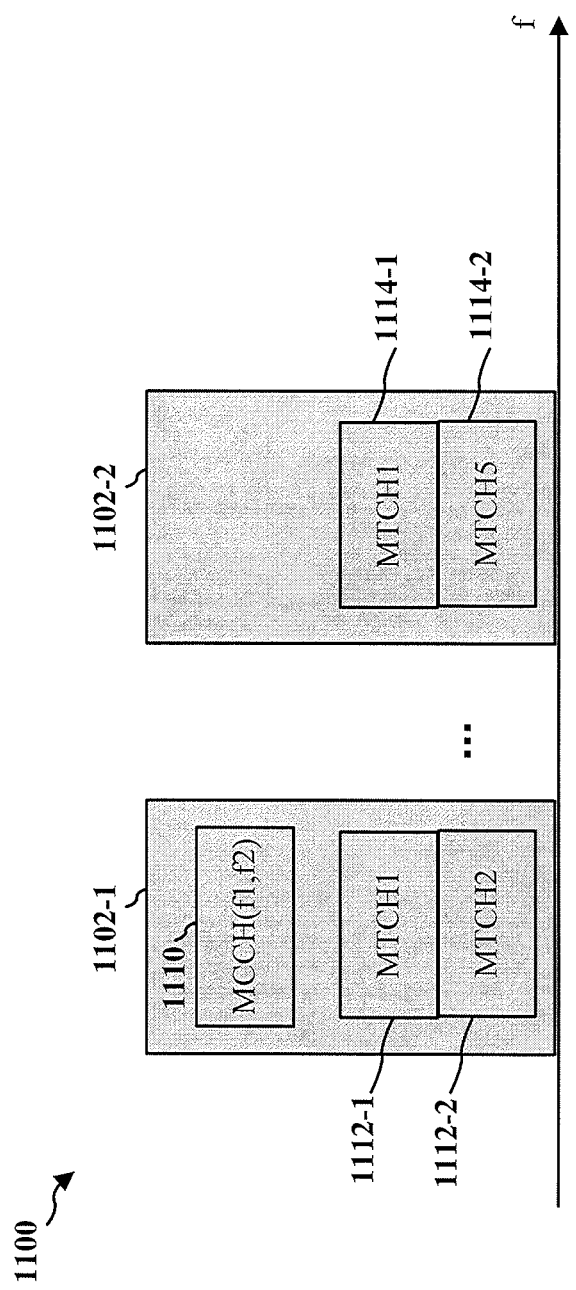
FIG. 11 is a diagram illustrating configuration information carried in an MCCH.

FIG. 11 is a diagram 1100 illustrating configuration information carried in an MCCH. With reference to FIG. 11, the MCCH 1110 provides configuration regarding the aggregated carriers 1102-1 and 1102-2. As disclosed earlier with reference to FIG. 7A, each MBSFN area may have one MCCH. As such, one MCH may multiplex one MCCH and a plurality of MTCHs. With reference to FIG. 11, the MCCH 1110 of carrier 1102-1 may indicate that the single service is carried on MTCHs 1112-1, 1112-2 of carrier 1102-1 and on MTCHs 1114-1, 1114-2 of carrier 1102-2.

The configuration information may be sent to the UE through the MCCH from each aggregated carrier which delivers the service. According to one aspect, the configuration information included in the USD is superseded when the configuration update is received via the MCCH. That is, the UE may override the USD configuration information received via the USD when the UE receives the configuration update from the MCCH.

According to another aspect, configuration information regarding the aggregated carriers may be included in the USD and, additionally, a SIB (e.g., SIB15) and/or the MCCH. The configuration information may be provided initially via the USD, as described earlier with reference to FIG. 10. Additionally, the network may provide updated configuration information via a SIB (e.g., SIB15), in order to improve service continuity.

Similar to the USD described earlier with reference to FIG. 10, the SIB15 may identify the frequencies of the aggregated carriers that are associated with each SAI. Further, similar to the MCCH described earlier with reference to FIG. 11, the SIB15 may identify the subframes of each aggregated carrier that are used in TDM mode.

According to one aspect, the configuration information is sent to the UE through the SIB15 via all aggregated carriers which carry the service. The UE receives the SIB15, which indicates that the service is carried via aggregated carriers. If the UE has the capability to receive the service via multiple frequencies, the UE may then proceed to decode the MCCH and receive the service accordingly. If the UE does not have the capability to receive the service in this manner, the UE need not proceed to decode the MCCH.

According to one aspect, the configuration information included in the USD is superseded when the configuration update is received via the SIB. That is, the UE may override the configuration information received via the SIB when it receives the configuration information in the SIB. According to a further aspect, the configuration information included in the SIB is superseded when the configuration update is received via the MCCH. For example, the UE may override the configuration information received via the SIB when it decodes the MCCH and the configuration information that is provided in the MCCH.

Configuration information has been described with reference to various aspects. Scheduling information of the aggregated carriers will now described in more detail.

According to one aspect, scheduling information for a particular carrier is provided in the MSI of the MCH of that particular carrier. Therefore, the MSI of a particular carrier includes scheduling information for only that particular carrier. As such, each carrier may be scheduled separately (or independently).

The format of an MSI MAC control element was described earlier with reference to FIG. 7B. As disclosed with reference to FIG. 7B, the MSI MAC control element may be sent in the first subframe of each scheduling period of the PMCH. The MSI MAC control element can indicate the stop frame and subframe of each MTCH within the PMCH.

As described earlier, even though the service is carried via multiple aggregated carriers, the MSI for a particular carrier may contain scheduling information for only that particular carrier. In such a configuration, the UE should monitor the MSI for each carrier independently.

According to an aspect described earlier, a network may use a first CC to send primary content, and use a second CC to send secondary content. The primary content and the secondary content may correspond to a single eMBMS service. The primary content (or base data) may be sent on the first CC via broadcast. According to further aspects, various types of secondary content may be sent via unicast (on either the first CC or the second CC) on an as-needed basis. For example, augmented or supplementary data may be sent via unicast on an as-needed basis. According to another example, missing data may be retransmitted by the network via unicast on as-needed basis.

Before the noted aspects are described in more detail, configuration information will first be described. Similar to configuration information that was described earlier with respect to a configuration (in which two or more aggregated carriers carry a single service), configuration information with respect to another configuration (in which primary content is sent on one carrier via broadcast, and secondary content is sent via unicast) is for facilitating proper reception and decoding of the service at the UE. For example, the configuration information may inform the UE of the particular service for which the primary content and the secondary content is provided. Further, the configuration information may identify the one or more carriers on which the broadcast content and the unicast content are provided.

As described earlier with reference to FIG. 10, configuration information may be sent via the USD. The configuration information in the USD may indicate that both broadcast content and unicast content are provided for a particular service. In addition, the configuration information may indicate a frequency (or frequencies) carrying the broadcast content and the unicast content. As described earlier, the broadcast content and the unicast content may be carried on a same frequency. Alternatively (or in addition), the broadcast content and the unicast content may be carried on different frequencies. When the unicast content includes augmented or supplementary, the USD may also indicate the server for unicast transmission.

The configuration information may be included in the USD and, additionally, in a SIB (e.g., SIB15) and/or the MCCH. According to one aspect, the configuration information included in the USD is superseded when the configuration update is received via the SIB. That is, the UE may override the configuration information received via the USD when the USD receives configuration information from the SIB. According to a further aspect, the configuration information received via the SIB is superseded when configuration information is received via the MCCH. That is, the UE may override the configuration information received via the SIB when the UE receives configuration information via the MCCH.

When the configuration information is included in the SIB or the MCCH, the configuration information may identify the subframes of each aggregated carrier that are used in TDM mode.

The unicast content that is sent on an as-needed basis may include augmented or supplementary data. For example, when a particular UE receiving an eMBMS service determines that it is experiencing a high error metric, the UE may establish a unicast link (e.g., in RRC-Connected Mode) through the Serving Gateway (S-GW) (see, e.g., Serving Gateway 116 of FIG. 1) or the PDN Gateway (P-GW) (see, e.g., PDN Gateway 118 of FIG. 1) to receive augmented data from the BM-SC (see, e.g., BM-SC 126 of FIG. 1) or the content provider. The error metric may be a block error rate (BLER), a bit error rate (BER) or a similar error metric.

The UE combines the augmented or supplementary data that is received via unicast with the primary content in order to reduce the error metric (e.g., BLER). For example, a reduction of the error metric to or below a certain target (e.g., 1%) may be desired. If the target error metric cannot be achieved in this manner, the UE may request that the service be provided solely via unicast. That is, the UE may request that the delivery of the service be switched from a broadcast delivery to a unicast delivery.

It is noted that the above-described aspect may be different from other situations in which the UE waits until the end of session before requesting a file repair. According to the disclosed aspect, the UE need not wait until the end of session before requesting augmented or supplementary data. This may be beneficial for improving the reliability of services including real-time streaming services.

As noted earlier, missing data may be retransmitted by the network on an as-needed basis via unicast. For example, when a UE receiving an eMBMS service experiences a high error metric (e.g., BLER), the UE may establish a unicast link (e.g., in RRC-Connected Mode) to request that missing RLC SDUs be provided from the eNB rather than from the P-GW. Accordingly, a Unicast Scheduler (or UC Scheduler) at the eNB may send the requested SDUs to the UE.

Figure 12A:
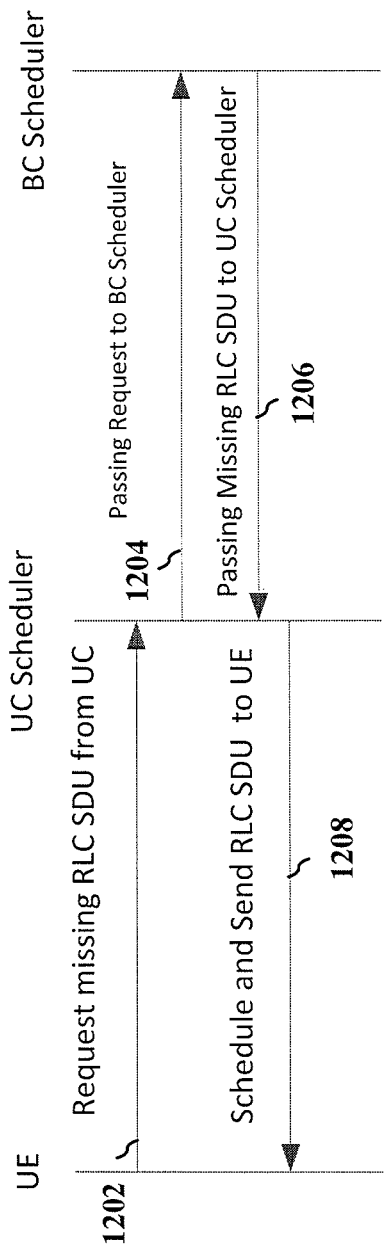
FIGS. 12A and 12B illustrate transmission of missing SDUs from the eNB (e.g., the UC Scheduler at the eNB) to the UE.
Figure 12B:
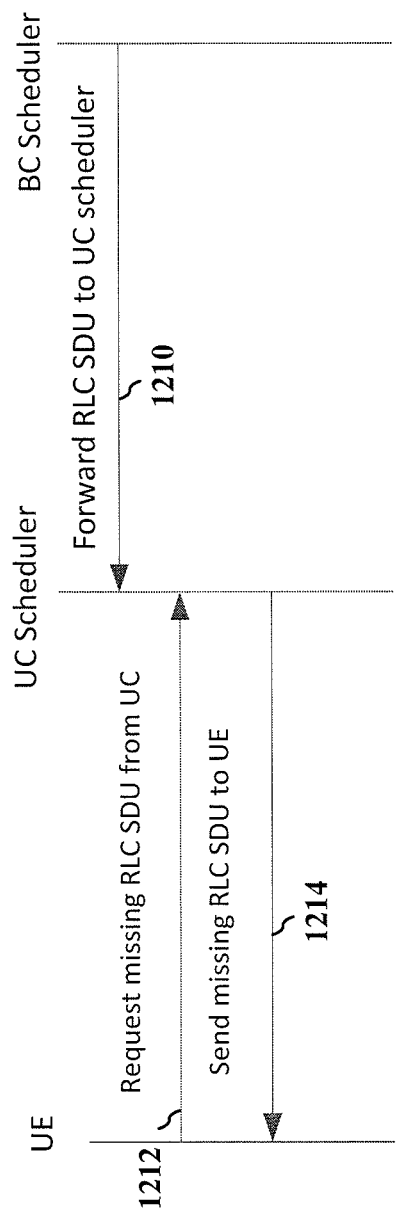

FIGS. 12A and 12B illustrate transmission of missing SDUs from the eNB (e.g., the UC Scheduler at the eNB) to the UE.

With reference to FIG. 12A, at 1202, a UE requests that missing RLC SDUs be provided via unicast. At 1204, the UC Scheduler at the eNB forwards the request to the Broadcast Scheduler (BC Scheduler), e.g., at the MCE. At 1206, the requested SDUs may be retrieved from buffers at the BC Scheduler and are then sent by the BC Scheduler to the UC Scheduler. At 1208, the UC Scheduler sends the requested SDUs to the UE.

FIG. 12B illustrates transmission of missing SDUs according to another aspect. With reference to FIG. 12B, at 1210, the BC scheduler forwards every RLC SDU of the eMBMS service to the UC Scheduler. The forwarded SDUs may be locally stored at the UC Scheduler. At 1212, the UE requests that missing RLC SDUs be provided via unicast. At 1214, the UC Scheduler sends the requested SDUs to the UE.

The UE may request RLC SDUs when determining that one or more RLC SDUs are missing (e.g., when the UE determines that it has not received one or more SDUs, or that one or more SDUs have been received unsuccessfully). The request message (e.g., the request that is sent at 1202 of FIG. 12A or at 1212 of FIG. 12B) may include parameters such as the corresponding RLC sequence ID, SAI, TMGI, SessionID, and logicalChannelId (e.g., MTCH ID).

Figure 13:
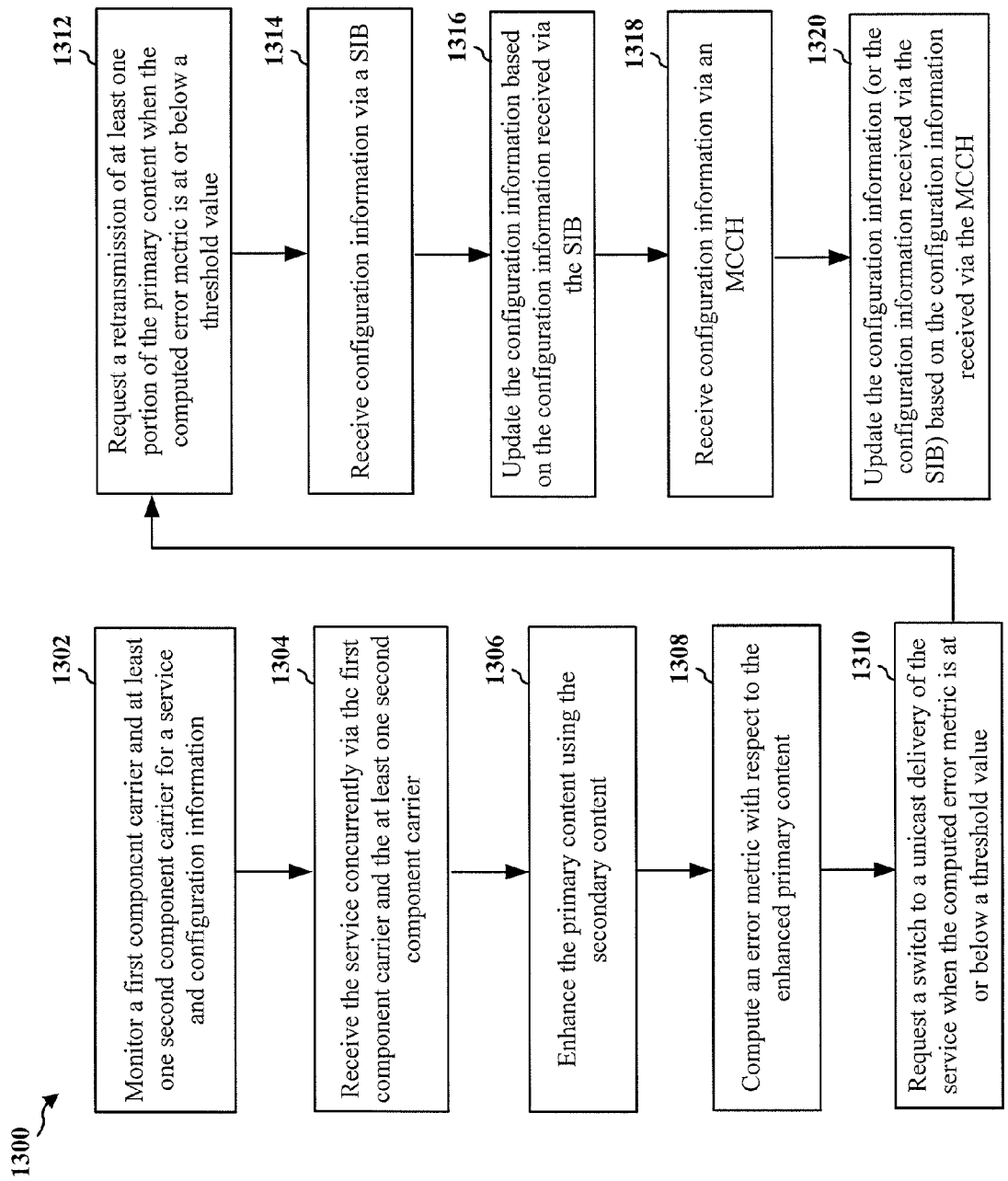
FIG. 13 is a flow chart of a method of wireless communication.

FIG. 13 is a flow chart 1300 of a method of wireless communication. The method may be performed by a UE (e.g., the UE 102, the apparatus 1402/1402'). At 1302, the UE monitors a first component carrier and at least one second component carrier for a service and configuration information. For example, the UE monitors any two or more of the carriers 802-1, 802-2, 802-3, 802-4, 804-1, 804-2 of FIG. 8 for an eMBMS service and corresponding configuration information. At 1304, the UE receiving the service concurrently via the first component carrier and the at least one second component carrier. For example, the eMBMS service is received concurrently via the two or more of the carriers 802-1, 802-2, 802-3, 802-4, 804-1, 804-2 of FIG. 8. At 1306, the UE enhances primary content (that is received via broadcast) using secondary content (that is received via unicast). The secondary content may be for enhancing service reliability, or for providing recovery of missing data. At 1308, the UE computes an error metric (e.g., BLER) with respect to the enhanced primary content. At 1310, the UE requests a switch to a unicast delivery of the service (e.g., the eMBMS service) when the computed error metric is at or below a threshold value. At 1312, the UE requests a retransmission of at least one portion of the primary content when the computed error metric is at or below a threshold value. For example, with reference to FIGS. 12A, 12B, the UE requests missing RLC SDUs at 1202, 1212. At 1314, the UE receives configuration information via a SIB. For example, the UE receives configuration information via SIB 15. At 1316, the UE updates the configuration information based on the configuration information received via the SIB (e.g., SIB15). At 1318, the UE receives configuration information via an MCCH. For example, the UE receives configuration information via MCCH 1110 of FIG. 11. At 1320, the UE updates the configuration information (or the configuration information received via the SIB) based on the configuration information received via the MCCH (e.g., MCCH 1110 of FIG. 11).

Figure 14:
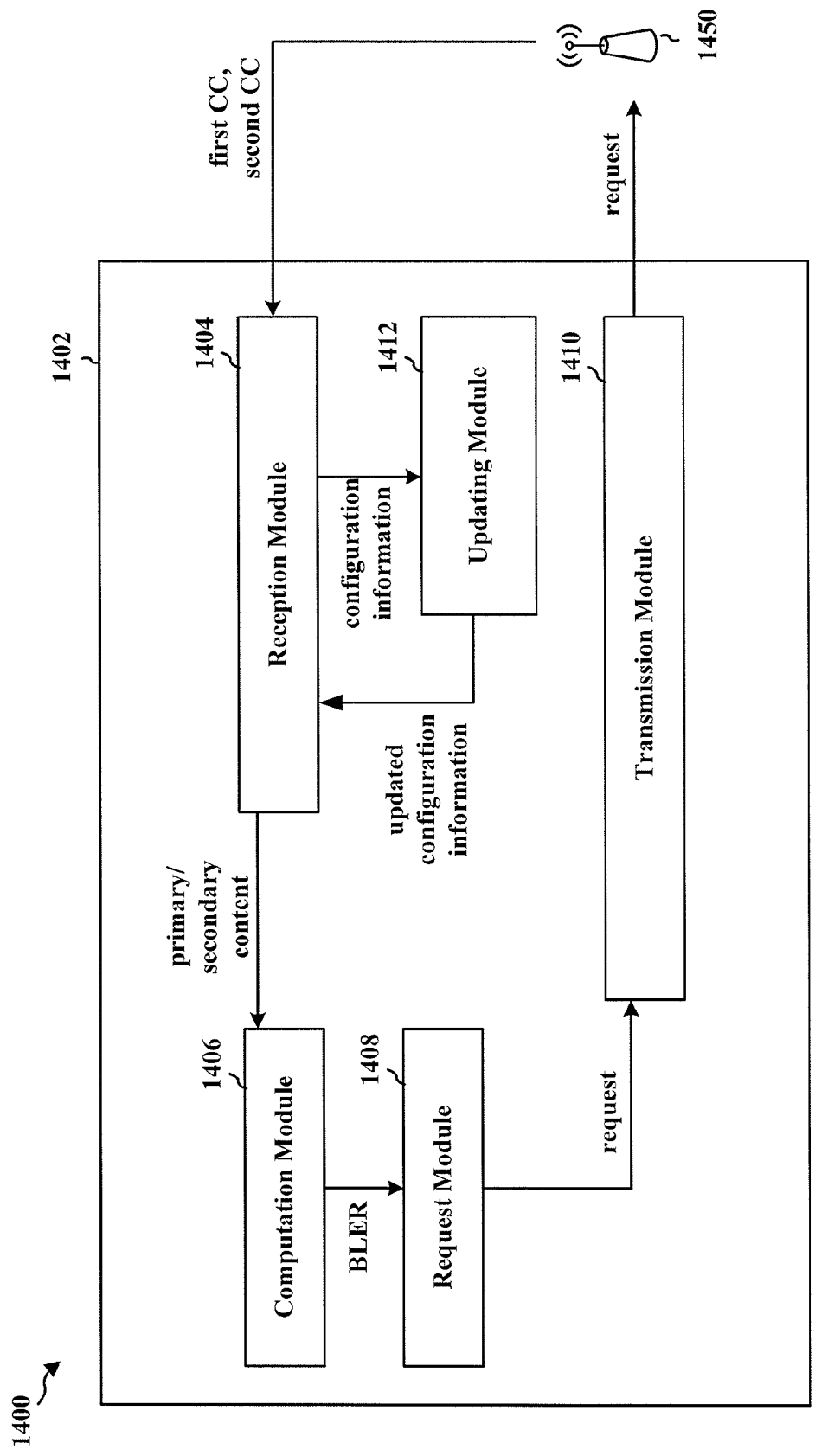
FIG. 14 is a conceptual data flow diagram illustrating the data flow between different modules/means/components in an exemplary apparatus.

FIG. 14 is a conceptual data flow diagram 1400 illustrating the data flow between different modules/means/components in an exemplary apparatus 1402. The apparatus may be a UE. The apparatus includes a reception module 1404 that monitors a first component carrier and at least one second component carrier for a service and configuration information provided by eNB 1450. The reception module 1404 further receives the service concurrently via the first component carrier and the at least one second component carrier. The reception module 1404 provides primary content and secondary content to the computation module 1406, which enhances the primary content (that is received via broadcast) using the secondary content (that is received via unicast). The computation module 1406 also computes an error metric (e.g., BLER) with respect to the enhanced primary content. The request module 1408 receives the computed error metric and requests a switch to a unicast delivery of the service (e.g., the eMBMS service) when the computed error metric is at or below a threshold value. The request module 1408 may request a retransmission of at least one portion of the primary content when the computed error metric is at or below a threshold value. The request is provided to the transmission module 1410 for transmission to the eNB 1450.

Returning to the reception module 1404, the reception module receives configuration information via a SIB. The configuration information received via the SIB is provided to the updating module 1412. The updating module 1412 updates the configuration information based on the configuration information received via the SIB. The updated configuration information is provided to the reception module 1404. The reception module 1404 receives configuration information via an MCCH. The configuration information received via the MCCH is provided to the updating module 1412. The updating module 1412 updates the configuration information (or the configuration information received via the SIB) based on the configuration information received via the MCCH. The updated configuration information is provided to the reception module 1404.

The apparatus may include additional modules that perform each of the blocks of the algorithm in the aforementioned flow chart of FIG. 13. As such, each block in the aforementioned flow chart of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
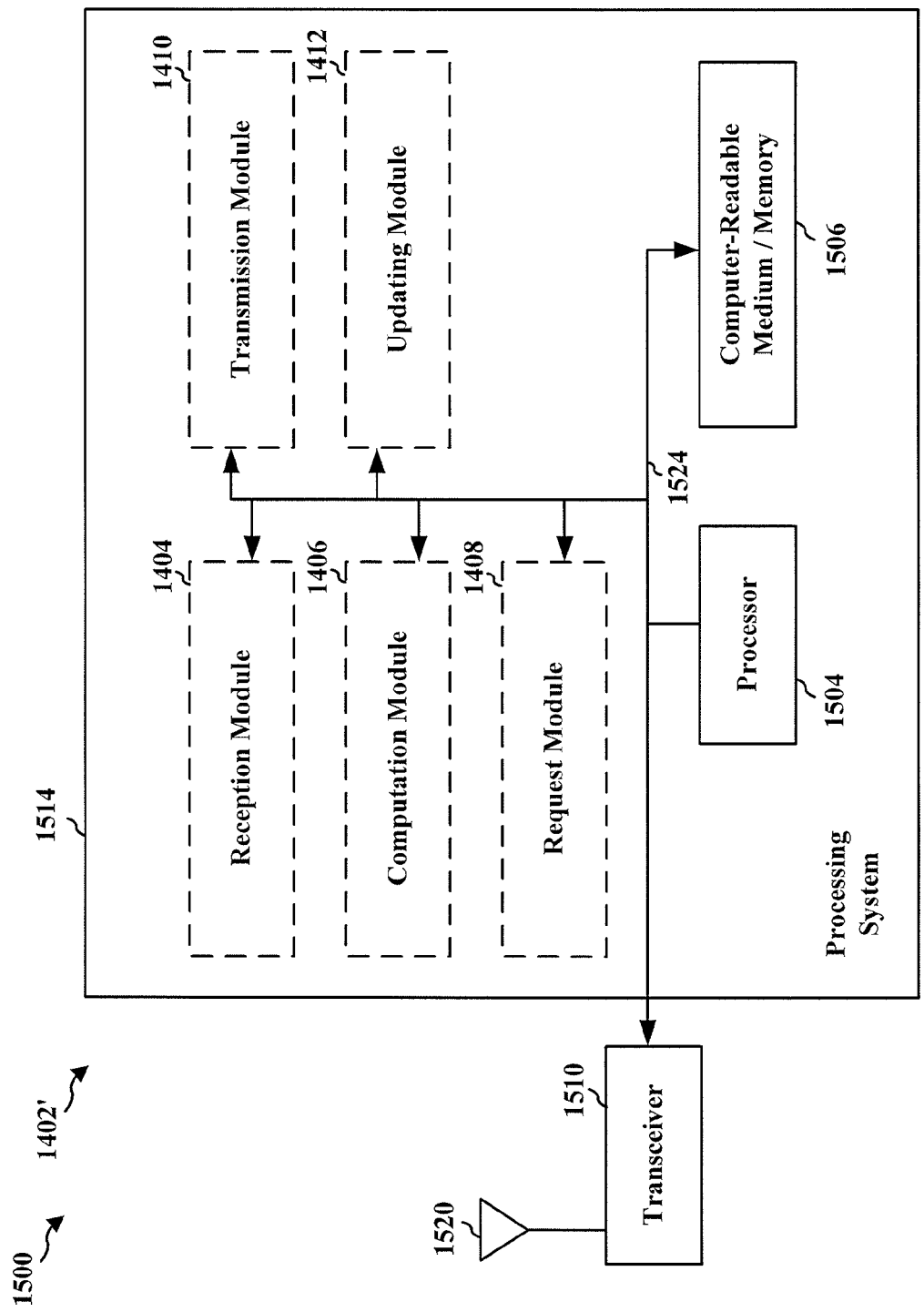
FIG. 15 is a diagram illustrating an example of a hardware implementation for an apparatus employing a processing system.

FIG. 15 is a diagram 1500 illustrating an example of a hardware implementation for an apparatus 1402' employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware modules, represented by the processor 1504, the modules 1404, 1406, 1408, 1410, 1412, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception module 1404. In addition, the transceiver 1510 receives information from the processing system 1514, specifically the transmission module 1410, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system further includes at least one of the modules 1404, 1406, 1408, 1410, 1412. The modules may be software modules running in the processor 1504, resident/stored in the computer readable medium/memory 1506, one or more hardware modules coupled to the processor 1504, or some combination thereof. The processing system 1514 may be a component of the UE 650 and may include the memory 660 and/or at least one of the TX processor 668, the RX processor 656, and the controller/processor 659.

In one configuration, the apparatus 1402/1402' for wireless communication includes means for monitoring (e.g., 1404, 656) a first component carrier and at least one second component carrier of a plurality of aggregated carriers for a service and configuration information associated with the service. The apparatus further includes means for receiving (e.g., 1404, 656) the service concurrently via the first component carrier and the at least one second component carrier. The at least one of the first component carrier or the at least one second component carrier carries the service via broadcast. In one configuration, the means for monitoring (e.g., 1404, 656) tunes to the first component carrier and the at least one second component carrier. In one configuration, both of the first component carrier and the at least one second component carrier carry the service via broadcast. In one configuration, one of the first component carrier or the at least one second component carrier further carries the service via unicast, or the other of the first component carrier or the at least one second component carrier carries the service via unicast. In one configuration, the means for receiving (e.g., 1404, 656) the service concurrently via the first component carrier and the at least one second component carrier receives primary content via broadcast. In such a configuration, the means for receiving (e.g., 1404, 656) the service concurrently via the first component carrier and the at least one second component carrier receives secondary content via unicast. In such a configuration, the apparatus further includes means for enhancing (e.g., 1406, 659) the primary content using the secondary content. In such a configuration, the apparatus further includes means for computing (e.g., 1406, 659) an error metric with respect to the enhanced primary content. In such a configuration, the apparatus further includes means for requesting (e.g., 1408, 1410, 659, 668) a switch to a unicast delivery of the service when the computed error metric is at or below a threshold value, before the service reaches an end of session. In such a configuration, the apparatus further includes means for requesting (e.g., 1408, 1410, 659, 668) a retransmission of at least one portion of the primary content when the computed error metric is at or below a threshold value, before the service reaches an end of session. In one configuration, the configuration information comprises a USD. In such a configuration, the apparatus further includes means for receiving (e.g., 1404, 656) second configuration information via an MCCH carried by at least one of the first component carrier or the at least one second component carrier. In such a configuration, the apparatus further includes means for updating (e.g., 1412, 659) the configuration information received via the USD based on the second configuration information received via the MCCH. In one configuration, the apparatus further includes means for receiving (e.g., 1404, 656) second configuration information via a SIB carried by at least one of the first component carrier or the at least one second component carrier. In such a configuration, the apparatus further includes means for updating (e.g., 1412, 659) the configuration information received via the USD based on the second configuration information received via the SIB. In such a configuration, the apparatus further includes means for receiving (e.g., 1404, 656) third configuration information via an MCCH carried by at least one of the first component carrier or the at least one second component carrier. In such a configuration, the apparatus further includes means for updating (e.g., 1412, 659) the second configuration information received via the SIB based on the third configuration information received via the MCCH. In one configuration, the service includes an eMBMS service.

The aforementioned means may be one or more of the aforementioned modules of the apparatus 1402 and/or the processing system 1514 of the apparatus 1402' configured to perform the functions recited by the aforementioned means. As described supra, the processing system 1514 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, the method comprising:
    monitoring a first component carrier and at least one second component carrier of a plurality of aggregated component carriers for a service and configuration information associated with the service;
    receiving the service concurrently via the first component carrier and the at least one second component carrier, wherein at least one of the first component carrier or the at least one second component carrier carries the service via broadcast or unicast, and wherein receiving the service concurrently via the first component carrier and the at least one second component carrier includes receiving primary content via broadcast and secondary content via unicast; and
    enhancing the primary content using the secondary content.

2. The method of claim 1, wherein both of the first component carrier and the at least one second component carrier carry the service via broadcast.

3. The method of claim 1, further comprising computing an error metric with respect to the primary content.

4. The method of claim 3, further comprising requesting a switch to a unicast delivery of the service when the computed error metric is at or below a threshold value, before the service reaches an end of session.

5. The method of claim 3, further comprising requesting a retransmission of at least one portion of the primary content when the computed error metric is at or below a threshold value, before the service reaches an end of session.

6. The method of claim 1, further comprising:
    receiving second configuration information via a Multicast Control Channel (MCCH) carried by at least one of the first component carrier or the at least one second component carrier; and
    updating the configuration information based on the second configuration information received via the MCCH.

7. The method of claim 1, further comprising:
    receiving second configuration information via a System Information Block (SIB) carried by at least one of the first component carrier or the at least one second component carrier; and
    updating the configuration information based on the second configuration information received via the SIB.

8. The method of claim 7, further comprising:
    receiving third configuration information via a Multicast Control Channel (MCCH) carried by at least one of the first component carrier or the at least one second component carrier; and
    updating the second configuration information received via the SIB based on the third configuration information received via the MCCH.

9. The method of claim 1, wherein the service comprises an enhanced Multimedia Broadcast Multicast Service (eMBMS) service.

10. An apparatus for wireless communication, comprising:
    a memory configured to store data; and
    at least one processor coupled to the memory, wherein the at least one processor is configured to:
        monitor a first component carrier and at least one second component carrier of a plurality of aggregated component carriers for a service and configuration information associated with the service;
        receive the service concurrently via the first component carrier and the at least one second component carrier, wherein at least one of the first component carrier or the at least one second component carrier carries the service via broadcast or unicast, and wherein to receive the service concurrently via the first component carrier and the at least one second component carrier, the at least one processor is further configured to receive primary content via broadcast and secondary content via unicast; and enhance the primary content using the secondary content.

11. The apparatus of claim 10, wherein both of the first component carrier and the at least one second component carrier carry the service via broadcast.

12. The apparatus of claim 10, wherein the at least one processor is further configured to compute an error metric with respect to the primary content.

13. The apparatus of claim 12, wherein the at least one processor is further configured to request a switch to a unicast delivery of the service when the computed error metric is at or below a threshold value, before the service reaches an end of session.

14. The apparatus of claim 12, wherein the at least one processor is further configured to request a retransmission of at least one portion of the primary content when the computed error metric is at or below a threshold value, before the service reaches an end of session.

15. The apparatus of claim 10, wherein the at least one processor is further configured to:
receive second configuration information via a Multicast Control Channel (MCCH) carried by at least one of the first component carrier or the at least one second component carrier; and
update the configuration information based on the second configuration information received via the MCCH.

16. The apparatus of claim 10, wherein the at least one processor is further configured to:
receive second configuration information via a System Information Block (SIB) carried by at least one of the first component carrier or the at least one second component carrier; and
update the configuration information based on the second configuration information received via the SIB.

17. The apparatus of claim 16, wherein the at least one processor is further configured to:
receive third configuration information via a Multicast Control Channel (MCCH) carried by at least one of the first component carrier or the at least one second component carrier; and
update the second configuration information received via the SIB based on the third configuration information received via the MCCH.

18. The apparatus of claim 10, wherein the service comprises an enhanced Multimedia Broadcast Multicast Service (eMBMS) service.

19. An apparatus for wireless communication, comprising:
means for monitoring a first component carrier and at least one second component carrier of a plurality of aggregated component carriers for a service and configuration information associated with the service;
means for receiving the service concurrently via the first component carrier and the at least one second component carrier, wherein at least one of the first component carrier or the at least one second component carrier carries the service via broadcast or unicast, and wherein primary content is received via broadcast and secondary content is received via unicast; and
means for enhancing the primary content using the secondary content.

20. The apparatus of claim 19, wherein both of the first component carrier and the at least one second component carrier carry the service via broadcast.

21. A non-transitory computer-readable medium storing computer executable code, comprising code for:
monitoring a first component carrier and at least one second component carrier of a plurality of aggregated component carriers for a service and configuration information associated with the service;
receiving the service concurrently via the first component carrier and the at least one second component carrier, wherein at least one of the first component carrier or the at least one second component carrier carries the service via broadcast or unicast, and wherein to receive the service concurrently via the first component carrier and the at least one second component carrier, the code further causes the at least one processor to receive primary content via broadcast and secondary content via unicast; and
enhancing the primary content using the secondary content.

22. The computer program product of claim 21, wherein both of the first component carrier and the at least one second component carrier carry the service via broadcast.

* * * * *